(No Model.) 2 Sheets—Sheet 2.
H. H. LLOYD.
METHOD OF MAKING ELECTRODES FOR SECONDARY BATTERIES.
No. 451,407. Patented Apr. 28, 1891.
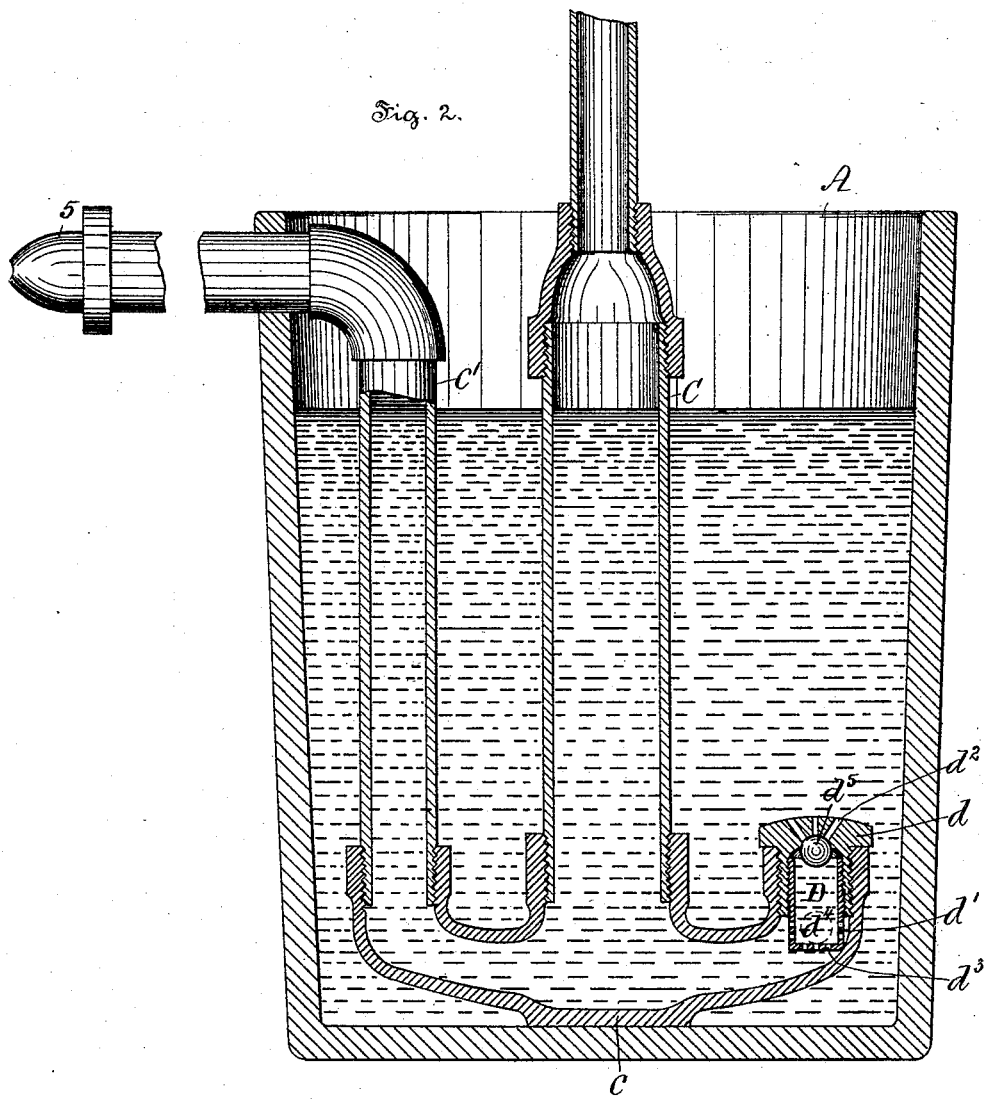

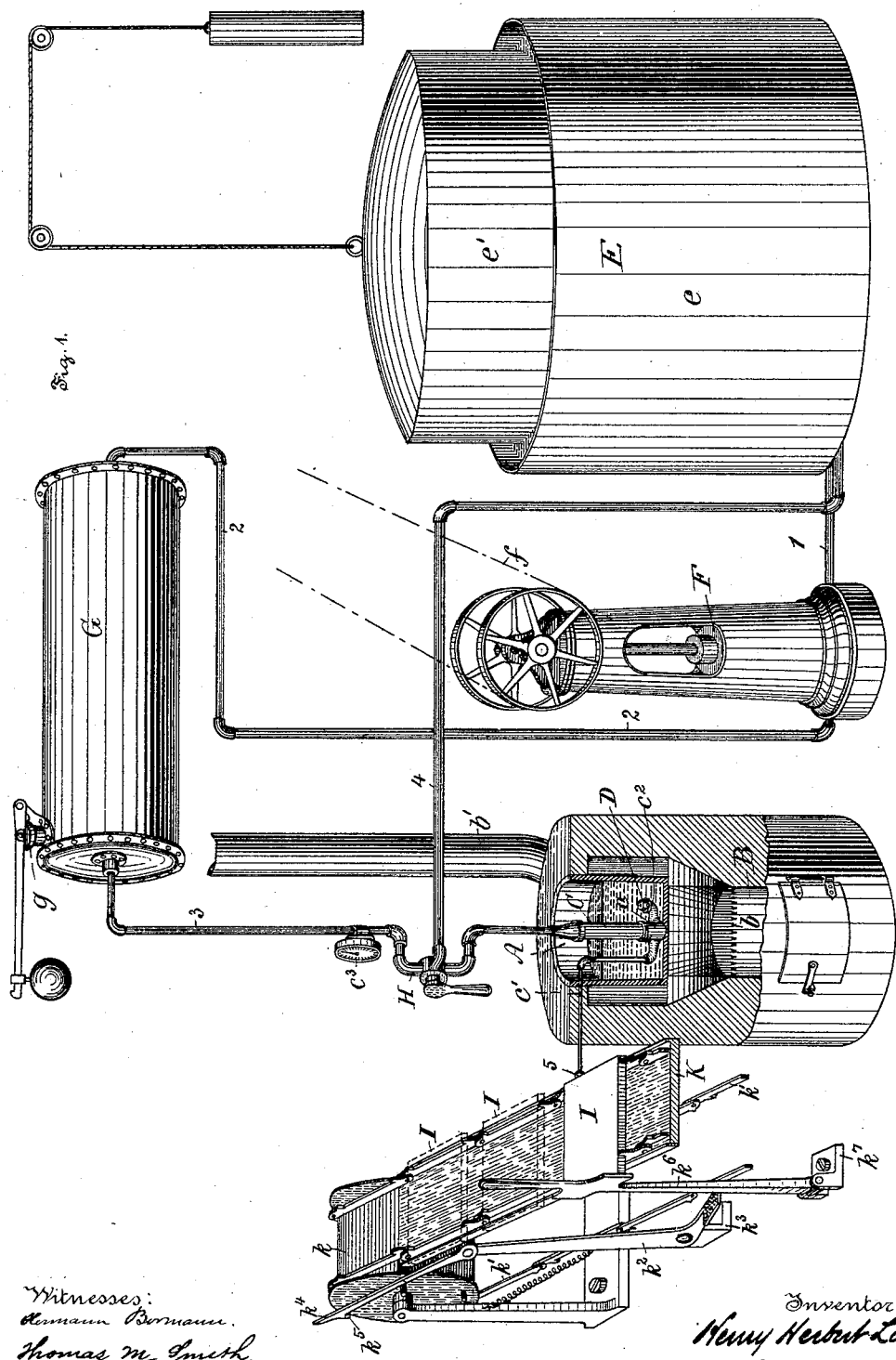

UNITED STATES PATENT OFFICE.

HENRY HERBERT LLOYD, OF CAMDEN, ASSIGNOR TO THE ELECTRIC STORAGE BATTERY COMPANY, OF GLOUCESTER CITY, NEW JERSEY.

METHOD OF MAKING ELECTRODES FOR SECONDARY BATTERIES.

SPECIFICATION forming part of Letters Patent No. 451,407, dated April 28, 1891.

Application filed October 27, 1890. Serial No. 369,434. (No model.)

*To all whom it may concern:*

Be it known that I, HENRY HERBERT LLOYD, a subject of the Queen of Great Britain, but now residing at Camden, in the county of Camden and State of New Jersey, have invented certain new and useful Improvements in the Method of Making the Plates or Elements of a Secondary or Storage Battery, of which the following is a specification.

My invention relates to an improvement in the method of providing a battery plate or element with an applied tough, compact, and dense supporting grid, frame, or rim.

It is well understood by those skilled in the art to which my invention appertains that lead and certain alloys are peculiarly adapted for the formation of a grid, frame, or support for a battery plate or element, and that such substance or materials have been largely, if not entirely, employed for the purpose. It is also well understood that the presence of an oxide or dross on or in the grid, frame, or support of a battery plate or element has a deleterious effect thereupon, in that it tends to cause the same to rapidly peroxidize or become honeycombed in use.

Heretofore in the manufacture of grids, frames, or supports for battery plates or elements it has been customary to melt lead or an alloy thereof—such as a mixture of lead and antimony or lead, antimony, and mercury—and to then pour the same by means of a ladle into a mold; but this method in practice possessed several disadvantages. For instance, if lead alone were employed, the surface of the molten metal running into the mold became oxidized by contact with the atmosphere, and this oxide or dross becoming diffused throughout the grid, frame, or support materially lessened the life or durability thereof. If an alloy of lead—such as a mixture of lead and antimony—were the metallic material employed, the molten mass became chilled and hardened before it had time to completely fill the mold, giving thereby a defective finished product. In both cases the dross collected upon the surface of the molten metallic mass and was apt to be dipped up in the ladle and poured into the mold.

The principal objects of my invention are, first, to avoid the above-mentioned disadvantageous features presented and to provide an expeditious, effective, and economical method of providing a battery plate or element with an applied tough, dense, and compact grid, frame, or rim free from dross, which, if existing therein, as above mentioned, has a deleterious effect upon the plate or element mounted in battery.

My invention consists in preparing and forming the active material or material adapted to become active into a plate or plates in a suitable appliance, and then applying thereto a material or materials in a fluid or molten state or condition to form a grid, supporting frame, or rim under a heavy pressure by means of compressed gas or gases.

In order to enable others skilled in the art to which my invention appertains to practice the same, I will now proceed to describe the preferred manner in which my invention may be carried into effect.

I take a salt of a metal, as chloride of lead, and to which I add the salt of another metal, as chloride of zinc; but any other suitable metallic salts may be employed, if preferred, for the composition of the mass. The mass is then fused in a crucible and formed into a crystallized plate or plates by pouring the fused mass into a two-part mold and allowing the same to cool and assume a crystallized form therein. One or more of the cast crystallized plates is or are placed in a second mold and a metallic material or materials—such as lead, lead and mercury, or other preferred metallic material or materials in a molten state or condition—is or are forced into, between, and around the battery plate or plates contained in the mold under a heavy pressure by means of compressed gas or gases, whereby the molten mass becomes instantaneously and firmly attached to said plate or plates contained in said mold, forming a tough or dense and compact supporting grid, frame, or rim free from oxides or dross, which avoids local action in the use of such plates or elements or of their becoming honeycombed in use. Both the process of casting the metallic salts or chlorides and of casting the grid, frame, or support thereto may be conducted in the same mold, as will be readily understood. The gas or gases for forcing the molten metallic material or materials into, between, and around the plate or plates contained in the mold is stored up in a holder of a capacity susceptible of being drawn upon at will in a manner to be hereinafter fully explained. In practice a pressure of one hundred pounds to the square inch has been found to give good results for forcing such a molten metallic mass into contact with the plate or plates; but a much greater pressure may be availed of with equally good results for forcing the molten metallic material or materials into contact with the battery plate or elements to form a grid, frame, or supporting-rim therefor.

I do not wish to be understood as broadly claiming herein the use of a metallic salt or salts for the formation of a battery plate or plates, as I am aware that the same is or are covered by existing patents; but my present invention comprises the providing of such a battery-plate with an applied tough or dense and compact grid, frame, or supporting-rim by the forcing of a molten metallic material or materials into contact with such plate or plates under a heavy pressure by means of compressed gas or gases, in order that the frame or rim so formed or applied to the plate or plates may be free from oxides or dross, which, if they or it existed therein, would cause in use such plate or plates to become honeycombed and peroxidized, and by the scaling of the grid, frame, or rim of the plate or plates the battery in a brief period of time to be short-circuited.

In the accompanying drawings, Figure 1 is a perspective view, partly in section, of one form of plant adapted for the conduct of the principal feature of my present invention, that of applying a grid, frame, or supporting-rim to a battery plate or element under a heavy pressure by means of compressed gas or gases; and Fig. 2 is a transverse sectional view of a portion of the apparatus, showing the details of construction thereof.

Referring now to the drawings, A is a crucible supported by and set in a suitable furnace B. The furnace B is constructed in any preferred manner, and is provided with a grate $b$ and a flue $b'$ for conducting away therefrom the products of combustion. The cylinder C is screwed into or otherwise attached to a cap $c$, resting upon the bottom of the crucible A. The cap $c$ is provided with a delivery-pipe $c'$, leading to the molds, and with a nipple $c^2$, adapted for the reception of a ball-valve D. The ball-valve D is located near the bottom of the crucible A and comprises two thimbles $d$ and $d'$, having the heads thereof perforated at $d^2$ and $d^3$ for admitting the molten metallic material or materials. These two thimbles $d$ and $d'$ are fitted to each other, so as to form a chamber $d^4$ for the reception of the ball $d^5$.

E is a gasometer provided with a tank $e$ and a counterbalanced receiver $e'$. The interior of the gasometer E communicates with a suitable apparatus for generating gas or gases. (Not shown.)

F is a force-pump operated by means of a belt $f$ and capable of drawing gas or gases from the gasometer E and forcing the same under pressure into the holder G, where it is stored for use. This holder G is provided with a safety-valve $g$ of the usual or any other preferred construction, in order to prevent excessive pressure of gas or gases therein.

1 is a pipe communicating with the interior of the receiver $e'$ and with the suction side of the pump F for drawing off the gas or gases from the gasometer.

2 is a pipe communicating with the forcing side of the pump F and with the interior of the holder G for delivering gas or gases under pressure thereto.

3 is a pipe provided with a pressure-gage $c^3$ and a three-way cock H and communicating with the holder G and cylinder C.

4 is a pipe communicating with the three-way cock H and with the receiver $e'$.

5 is a nozzle attached to the pipe $c'$ and adapted to be fitted into the sprue of the mold I.

A series of molds I in regular succession is advanced in the direction of or to the casting apparatus and supported during the operation of casting on a table K. This table K is provided at the respective extremities thereof with drums $k$, one of which is not shown in the drawings.

$k'$ is a link belt passing over and engaging with drums $k$ and adapted to receive a series of molds between the links thereof.

$k^2$ is a foot-lever pivotally attached to the fixed fulcrum $k^3$ and provided with a pawl $k^4$, adapted to engage with pins $k^5$, attached to one of the drums $k$, so that both the drums $k$ may be rotated and the molds I advanced toward the nozzle 5 by simply depressing the foot-lever $k^2$.

$k^6$ is a hand-lever pivotally connected with a fixed support $k^7$ and adapted to retain the sprue of the mold in close contact with the nozzle 5.

It may be remarked that good results have been attained by employing a cylinder of a greater capacity than a mold in order to prevent any possibility of the apparatus being emptied, and, moreover, to avoid the escape of the compressed gas or gases into a mold; but, however, the contents of the cylinder C may, if preferred, be such that it will equal always in capacity the contents of one mold.

The method of forcing the molten material or materials such as hereinbefore described into the mold to form a grid, frame, or supporting-rim to, between, or around a battery plate or plates according to my invention may be carried out by means of the above-described apparatus, as follows: The three-way cock H is turned so that the cylinder C is not in communication with the holder G. Lead or an alloy thereof is melted in the crucible A by means of a fire in the furnace B, and, flowing through the perforations $d^2$ and $d^3$ past the ball $d^5$ of the valve D, fills the cylinder C, while at the same time gas or gases is or are drawn from the gasometer E and conducted by means of the force-pump F under pressure into the holder G. A series of molds or flasks I, containing the cast-plates, are placed upon the link belt $k'$ and caused to travel along the table K by means of the foot-lever $k^2$ until the sprue of one of the molds I is opposite the nozzle 5. The sprue of a mold I is forced into air-tight connection with the nozzle 5 by means of the hand-lever $k^6$. The three-way cock H is then turned so that gas or gases from the holder G, passing through the pipe 3 into the cylinder C, force the molten metal through the pipe $c'$ and nozzle 5 into the mold I. After a mold I is filled the three-way cock H is turned so that the gas or gases is or are confined in the holder G, and the gas or gases remaining in the cylinder C is or are permitted to escape through the pipe 4 into the receiver $e'$ or into the atmosphere, whereupon a fresh charge of molten metallic material flowing past the ball $d^5$ of the valve D refills the cylinder C. Again, if preferred, the three-way cock H may be so constructed that the gas or gases may be confined in the holder G without permitting the same to escape from the cylinder C through the pipe 4 into the receiver $e'$. In such case it is of course necessary to periodically turn the cock H so as to permit the gas or gases to escape from the cylinder C into the receiver $e'$, in order that the cylinder C may be refilled with molten metallic material or materials. After one of the molds of the series is filled it is removed and another advanced by means of the link belt $k'$ and hand-lever $k^6$, and the above-described operation may be repeated for an indefinite period.

By drawing the metallic substance or materials from the bottom of the crucible A the danger of forcing dross or other impurities into the mold is obviated, because such impurities naturally collect and float on the surface of the metallic mass in the crucible A.

The gas employed for forcing the molten metallic material or materials into the mold to constitute a grid, frame, or supporting-rim for the plate or plates, to which preference is given, consists of hydrogen or a mixture of hydrogen and carbonic oxide, commonly known as "water-gas," for the reason that such gas or gases tend to reduce any oxides that may be present in the molten metallic mass, yet, nevertheless, ordinary illuminating-gas may be employed in this connection with good results. Then, again, atmospheric air may be employed in lieu of the above-mentioned gases, provided the cylinder C be supplied with a suitable appliance for dropping oil continuously on the surface of the molten lead or metallic mass contained therein, the oil thus supplied in such instance covering the molten lead or metallic mass, and thereby protecting it from the oxidizing action of the air. Moreover, if the molten metal is sufficiently hot it will either volatilize or decompose the oil, thereby producing in the presence of the mass in the cylinder C an innocuous or non-oxidizing gas.

When air is employed, the gasometer E may be dispensed with and the air drawn into the pump F directly from the atmosphere.

The molten metallic mass forced into, onto, between, or around the plate or plates mounted in a mold I is allowed to set or become cool and the then framed plate or plates removed therefrom for use as a battery plate or element.

The method hitherto practiced in the casting of grids, frames, or supporting-rims to, around, and between battery plates or elements has been attended with many objections and inconveniences, the principal being the defective union between the plate and the grid, rim, or frame thereof, which caused crevices to be formed between them and into which the electrolyte of the cell penetrated, thereby appreciably impairing the electrical conductivity of the battery plates or elements and causing separation of the plates from their frames or rims, while by my invention each plate and rim is firmly and inseparably connected and a tight joint effected between each plate and its rim, which is due to the heavy pressure and rapidity with which the molten mass to form the grid, frame, or rim is caused to contact with the battery plate or element.

Having thus described the nature and objects of my invention, what I claim as new, and desire to secure by Letters Patent, is—

1. An improvement in the art of making and providing a battery plate or element with a grid, frame, or supporting-rim, which consists in preparing material or materials to constitute the plate or element and forming the mass in a suitable appliance, and then applying thereto a molten material or materials under a heavy pressure by means of compressed gas or gases to cause said grid, frame, or rim to be instantaneously and firmly attached to the plate or element, substantially as and for the purposes set forth.

2. An improvement in the art of making and providing a battery plate or element with a grid, frame, or supporting-rim, which consists in preparing a compound composed of the salt or salts of a metal or metals and casting into plates, and then applying a molten material or materials under a heavy pressure by means of compressed gas or gases to cause said grid, frame, or rim to be firmly attached to said plate or element without the presence of oxides or dross therein, substantially as set forth.

In witness whereof I have hereunto set my signature in the presence of two subscribing witnesses.

HENRY HERBERT LLOYD.

Witnesses:
GEO. W. REED,
THOMAS M. SMITH.